US010983138B2

(12) United States Patent
Schacher et al.

(10) Patent No.: US 10,983,138 B2
(45) Date of Patent: Apr. 20, 2021

(54) SAMPLE HANDLING DEVICE

(71) Applicant: Roche Diagnostics Operations, Inc., Indianapolis, IN (US)

(72) Inventors: Gottlieb Schacher, Kriens (CH); Beat Jaeggi, Lucerne (CH); Patrik Imfeld, Emmenbruecke (CH); Harald Ferihumer, Hitzkirch (CH)

(73) Assignee: Roche Diagnostics Operations, Inc., Indianapolis, IN (US)

( * ) Notice: Subject to any disclaimer, the term of this patent is extended or adjusted under 35 U.S.C. 154(b) by 281 days.

(21) Appl. No.: 16/031,442

(22) Filed: Jul. 10, 2018

(65) Prior Publication Data

US 2018/0321268 A1    Nov. 8, 2018

Related U.S. Application Data

(63) Continuation of application No. PCT/EP2017/050813, filed on Jan. 16, 2017.

(30) Foreign Application Priority Data

Jan. 22, 2016  (EP) ..................................... 16152355

(51) Int. Cl.
*G01N 35/02*        (2006.01)
*B25J 18/04*        (2006.01)
(Continued)

(52) U.S. Cl.
CPC .............. *G01N 35/02* (2013.01); *B25J 18/04* (2013.01); *B65G 21/22* (2013.01); *B65G 37/005* (2013.01);
(Continued)

(58) Field of Classification Search
CPC ........ G01N 35/02; G01N 35/04; G01N 35/10; G01N 35/1009; G01N 2035/0477;
(Continued)

(56) References Cited

U.S. PATENT DOCUMENTS 1,218,746 A    3/1917  Coombs
2,503,864 A *  4/1950  Carter .................. B65G 47/846
                                            198/441
(Continued)

FOREIGN PATENT DOCUMENTS

CN    101728573 A    6/2010
CN    203959305 U   11/2014
(Continued)

OTHER PUBLICATIONS

International Search Report dated May 17, 2017, in Application No. PCT/EP2017/050813, 4 pp.

*Primary Examiner* — Benjamin R Whatley
*Assistant Examiner* — Curtis A Thompson
(74) *Attorney, Agent, or Firm* — Roche Diagnostics Operations, Inc.

(57) ABSTRACT

A sample handling device for a laboratory automation system comprising a first carousel with a disc supported on a first axis, a second carousel with a disc supported on a second axis parallel to the first axis, and a transfer element between the first and second carousels is presented. Each disc has recesses distributed radially about the disc perimeter. Each recess receives a tube carrier. The first carousel and the second carousel connect via a passage for transferring sample tube carriers between the first and second carousels. The transfer element is a track switch which when in a rest position partly closes the passage to separate the first carousel from the second carousel. The track switch is swiveled and/or rotated about a third axis parallel to the first axis out of the rest position for transferring a tube carrier from the first carousel to the second carousel via the passage.

17 Claims, 2 Drawing Sheets

(51) Int. Cl.
*B65G 37/00* (2006.01)
*B65G 21/22* (2006.01)
*G01N 35/04* (2006.01)
*B65G 47/84* (2006.01)
*B65G 29/00* (2006.01)
*B65G 47/68* (2006.01)
*B65G 47/64* (2006.01)
*B65G 17/12* (2006.01)
*B65G 47/57* (2006.01)
*G01N 21/01* (2006.01)
*B65G 35/00* (2006.01)
*G01N 35/10* (2006.01)
*B65G 54/02* (2006.01)
*B66B 11/04* (2006.01)
*B65G 43/08* (2006.01)
*B07C 5/34* (2006.01)
*B65G 17/18* (2006.01)
*B65G 47/52* (2006.01)
*G01N 1/00* (2006.01)
*G01N 35/00* (2006.01)

(52) U.S. Cl.
CPC .......... *G01N 35/04* (2013.01); *B07C 5/34* (2013.01); *B65G 17/12* (2013.01); *B65G 17/18* (2013.01); *B65G 29/00* (2013.01); *B65G 35/00* (2013.01); *B65G 43/08* (2013.01); *B65G 47/52* (2013.01); *B65G 47/57* (2013.01); *B65G 47/64* (2013.01); *B65G 47/68* (2013.01); *B65G 47/84* (2013.01); *B65G 47/846* (2013.01); *B65G 54/02* (2013.01); *B66B 11/04* (2013.01); *G01N 21/01* (2013.01); *G01N 35/10* (2013.01); *G01N 35/1009* (2013.01); *G01N 2001/002* (2013.01); *G01N 2035/00752* (2013.01); *G01N 2035/0406* (2013.01); *G01N 2035/0439* (2013.01); *G01N 2035/0453* (2013.01); *G01N 2035/0465* (2013.01); *G01N 2035/0467* (2013.01); *G01N 2035/0477* (2013.01)

(58) Field of Classification Search
CPC .......... G01N 21/01; G01N 2035/0453; G01N 2001/002; G01N 2035/00752; G01N 2035/0406; G01N 2035/0465; G01N 2035/0467; G01N 2035/0439; B25J 18/04; B65G 21/22; B65G 37/005; B65G 17/18; B65G 43/08; B65G 54/02; B65G 17/12; B65G 47/57; B65G 35/00; B65G 29/00; B65G 47/68; B65G 47/64; B65G 47/84; B65G 47/846; B65G 47/52; B07C 5/34; B66B 11/04
See application file for complete search history.

(56) References Cited

U.S. PATENT DOCUMENTS

| | | |
|---|---|---|
| 3,575,692 A | 4/1971 | Gilford |
| 4,595,562 A | 6/1986 | Liston et al. |
| 4,858,767 A | 8/1989 | Myers et al. |
| 6,394,260 B1 | 5/2002 | Barth et al. |
| 7,670,553 B2 | 3/2010 | Babson |
| 2002/0001542 A1* | 1/2002 | Itoh .................. G01N 1/28 422/63 |
| 2003/0089581 A1* | 5/2003 | Thompson ......... B65G 47/1485 198/619 |
| 2012/0043183 A1 | 2/2012 | Hannessen |
| 2014/0291121 A1* | 10/2014 | Broers .................. B65G 37/00 198/602 |
| 2014/0305227 A1* | 10/2014 | Johns .................. B04B 7/08 73/863.01 |
| 2015/0276778 A1 | 10/2015 | Riether et al. |
| 2016/0214799 A1* | 7/2016 | Walter ................. B65G 43/10 |
| 2017/0088366 A1* | 3/2017 | Kawahara ............. B65B 43/50 |

FOREIGN PATENT DOCUMENTS

| | | |
|---|---|---|
| DE | 3809294 A1 | 10/1989 |
| DE | 102008002245 A1 | 12/2009 |
| DE | 102010028905 A1 | 11/2011 |
| FR | 2576003 B1 | 4/1992 |
| GB | 261933 A | 12/1926 |
| GB | 1010431 A | 11/1965 |
| GB | 2435098 A | 8/2007 |
| JP | S47-4253 Y1 | 2/1972 |
| JP | S53-122724 U | 9/1978 |
| JP | S55-031487 U | 2/1980 |
| JP | S61-44742 U | 3/1986 |
| JP | S62-76465 A | 4/1987 |
| JP | H03-118921 U | 12/1991 |
| JP | 2002-098705 A | 4/2002 |
| WO | 1991/001007 A1 | 1/1991 |
| WO | 2003/042048 A3 | 5/2003 |
| WO | 2013/064665 A1 | 5/2013 |
| WO | 2013/070740 A1 | 5/2013 |
| WO | 2015/059620 A1 | 4/2015 |

\* cited by examiner

SAMPLE HANDLING DEVICE

CROSS-REFERENCE TO RELATED APPLICATIONS

This application is a continuation of PCT/EP2017/050813, filed Jan. 16, 2017, which is based on and claims priority to EP 16152355.0, filed Jan. 22, 2016, which is hereby incorporated by reference.

BACKGROUND

The present disclosure generally relates to a sample handling device for use in a laboratory automation system and further relates to a laboratory automation system comprising a sample handling device.

A laboratory automation system comprises a number of pre-analytical, analytical and/or post-analytical stations, in which samples, for example blood, saliva, swab, urine and other specimens taken from the human body, are processed. It is generally known to provide sample tubes containing the samples. The sample tubes are also referred to as test tubes. For processing of the sample, the sample tubes are distributed to designated stations or operating positions of the laboratory automation system.

Several sample tubes can be placed in so-called racks for a handling. In an alternative distribution system, sample tubes are placed in an upright or vertical position in so called pucks having a retaining area for retaining one single sample tube.

There is a need for a sample handling device allowing for a precise positioning of sample tubes, which is simple in construction and robust and flexible in operation.

SUMMARY

According to the present disclosure, a sample handling device for a laboratory automation system is presented. The sample handling device can comprise a first carousel with a disc supported rotatably about a first axis, a second carousel with a disc supported rotatably about a second axis parallel to the first axis, and at least one transfer element arranged between the first carousel and the second carousel. Each disc can have a plurality of recesses distributed radially about a perimeter of the disc. Each recess can be configured to receive a sample tube carrier. The first carousel and the second carousel can be connected via a passage allowing for a transfer of sample tube carriers between the first carousel and the second carousel. The at least one transfer element can be a track switch which, when in a rest position, at least can partly close the passage to separate the first carousel from the second carousel. The track switch can be swiveled and/or rotated about a third axis parallel to the first axis out of the rest position for selectively transferring a sample tube carrier from the first carousel to the second carousel via the passage.

Accordingly, it is a feature of the embodiments of the present disclosure to provide for a sample handling device allowing for a precise positioning of sample tubes, which is simple in construction and robust and flexible in operation. Other features of the embodiments of the present disclosure will be apparent in light of the description of the disclosure embodied herein.

BRIEF DESCRIPTION OF THE SEVERAL VIEWS OF THE DRAWINGS

The following detailed description of specific embodiments of the present disclosure can be best understood when read in conjunction with the following drawings, where like structure is indicated with like reference numerals and in which.

DETAILED DESCRIPTION

Figure 1:
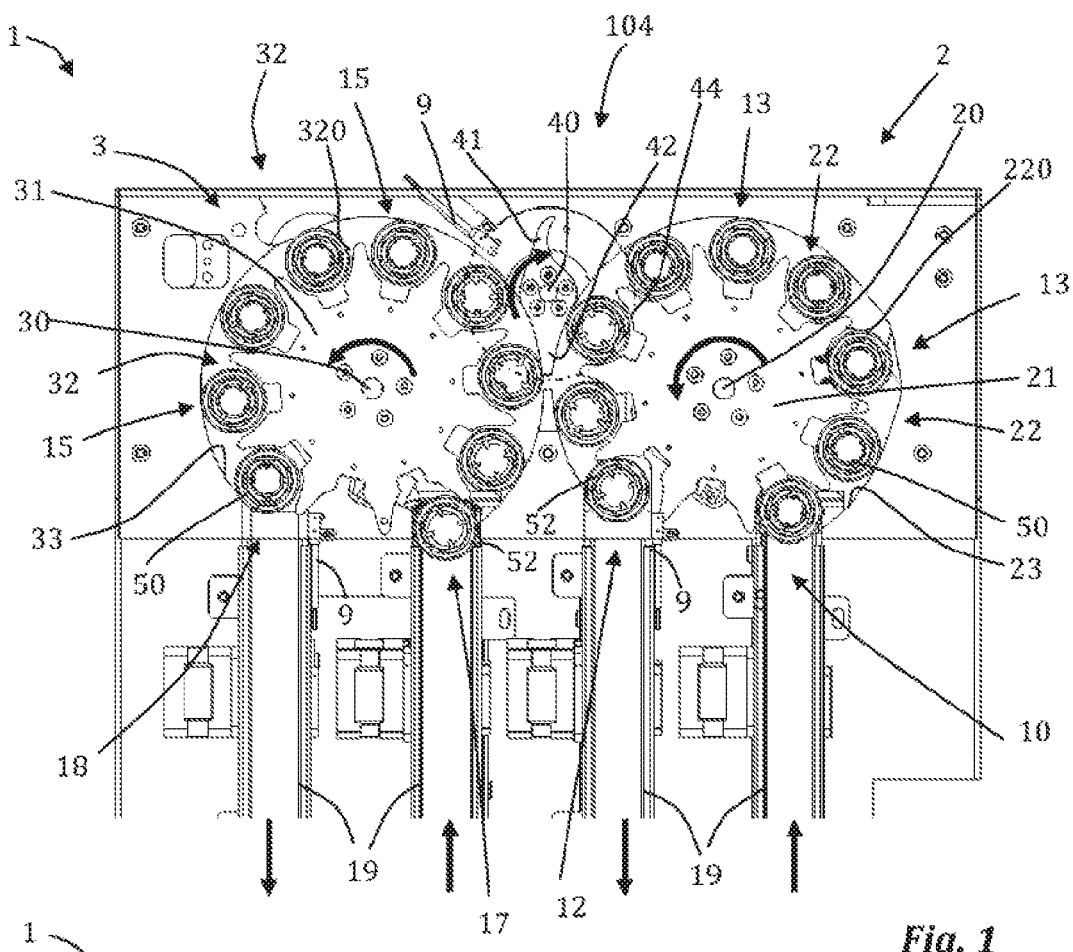
FIG. 1 illustrates a top view of a sample handling device in a first operation mode according to a first embodiment of the present disclosure.

In the following detailed description of the embodiments, reference is made to the accompanying drawings that form a part hereof, and in which are shown by way of illustration, and not by way of limitation, specific embodiments in which the disclosure may be practiced. It is to be understood that other embodiments may be utilized and that logical, mechanical and electrical changes may be made without departing from the spirit and scope of the present disclosure.

A sample handling device for a laboratory automation system is presented. The sample handling device can comprise a first carousel with a disc supported rotatably about a first axis, a second carousel with a disc supported rotatably about a second axis parallel to the first axis, and at least one transfer element arranged between the first carousel and the second. Each disc can have a plurality of recesses distributed radially about a perimeter of the disc. Each recess can be configured to receive a sample tube carrier. The first carousel and the second carousel can be connected via a passage allowing for a transfer of sample tube carriers between the first carousel and the second carousel. The at least one transfer element can be a track switch, in which the track switch when in a rest position can at least partly close the passage to separate the first carousel from the second carousel. The track switch can be configured to swivel and/or rotate about a third axis parallel to the first axis out of the rest position for selectively transferring a sample tube carrier from the first carousel to the second carousel via the passage.

The sample tube carriers can be designed to retain one single sample tube or a plurality of sample tubes. The sample handling device can handle loading of carriers and/or empty carriers. The carousels can allow for a precise positioning of the carriers at operating positions or stations arranged at the periphery of the carousels. As will be apparent to the person skilled in the art, further carousels with additional transfer elements between adjacent carousels can be added to the device. The transfer elements can be in the form of a track switch or in the form of a rotating star wheel conveyor, which can continuously transfer sample tube carriers between adjacent carousels. The number of carousels, the number of recesses at the carousels, and the size of the carousels can be configured to the number of process cycles required. Providing two or more carousels instead of one single carousel can allow for an optimized use of space available and/or for a distribution of carriers to different subsequent stations or supply lines. When providing a rotatable or swivelable transfer element, the sample tube carriers can be moved along a curved path such as, for example, along a circular-arc path by rotating the at least one transfer element.

If required, for example in the case of a malfunction or failure in a work process carried out while the sample tube carrier is conveyed by the first carousel, the sample tube carrier can be transferred to the second carousel, whereas the other sample tube carriers can remain on the first carousel. Alternatively, defective sample tube carriers can remain on the first carousel and all other sample tube carriers can be transferred to the second carousel. For the transfer of one sample tube carrier, in one embodiment, the track switch can be configured to be swivelable and swiveled back-and-forth about the third axis for selectively transferring single sample tube carriers. In other embodiments, the track switch can be configured to be rotatable and rotated stepwise or continuously with the same direction of rotation for selectively transferring sample tube carriers to the second carousel.

Due to centrifugal forces resulting from the rotation, the carriers can be forced in radial direction away from the axis of rotation of each disc. In order to retain the carriers in the recesses of the carousels, in one embodiment, guide rails encircling at least part of the periphery of the carousels, can be provided. The carriers can be retained within a respective recess while being supported between contact surfaces of the recesses itself and the respective guide rail. In the region of the track switch, the guide rails can each be provided with a clearance for forming the passage between the first carousel and the second carousel.

In one embodiment, the track switch can comprise at least one radially extending finger. The at least one finger can be configured to push a sample tube carrier from the first carousel to the second carousel when rotating the track switch about the third axis out of the rest position. The at least one finger in the rest position of the track switch can at least partly close the passage between the first carousel and the second carousel. In one embodiment, the track switch can be driven to rotate in either direction for transferring a sample tube carrier from the first carousel to the second carousel and vice versa. In other embodiments, the track switch can only be operated to transfer a sample tube carrier from the first carousel to the second carousel and not from the second carousel to the first carousel.

In one embodiment, the track switch can comprise at least a first finger and a second finger offset to the first finger by about 180°. The first finger can be configured to push a sample tube carrier from the first carousel to the second carousel when rotating the track switch about the third axis out of the rest position and the second finger in the rest position of the track switch can at least partly close the passage between the first carousel and the second carousel. In this case, each finger can be designed in accordance with its function. For example, in one embodiment, the first finger can be hook-shaped to grip the sample tube carrier upon the transfer. The second finger, in one embodiment, can be designed to extend the circular path of the guide rails. In other embodiments, both fingers can have the same form. In this case, both fingers can be configured to close the passage and to push a sample tube carrier for effecting a transfer of the sample tube carrier.

In another embodiment, the track switch can comprise a disc with a separation wall. In the rest position of the track switch, the separation wall can at least partly close the passage between the first carousel and the second carousel. The together with the separation wall can be configured to be swiveled and/or rotated out of the rest position to selectively transfer a sample tube carrier from the first carousel to the second carousel.

The dimension and position of the at least one transfer element can be configured to the dimension of the carousels and the distance between the carousels.

In some embodiments, a distance between the first axis and the third axis can be less than the sum of the radius of an envelope curve of the at least one transfer element and the radius of an envelope curve of the first carousel and/or a distance between the second axis and the third axis can be less than the sum of the radius of the envelope curve of the at least one transfer element and the radius of an envelope curve of the second carousel. The at least one finger or the separation wall of the at least one transfer element can be offset in the direction of the third axis from the disc of the first carousel and the disc of the second carousel, respectively. In the context of the application, the envelope curve can be defined as the enclosing circle of the at least one finger or the separation wall of the transfer element and the discs of the carousels, respectively. In other words, the carousels and the transfer elements can be arranged and dimensioned such that the envelope curves can intersect in a plane substantially perpendicular to the axes and the at least one transfer element can mesh with the discs of the carousels for transferring carriers between the carousels. For avoiding collisions, the discs and the at least one finger or the separation wall of the transfer element can be offset. The axis of the carousels and the transfer element, in one embodiment, can be aligned along one common straight line. In other embodiments, the third axis associated with the transfer element can be offset from a straight line connecting the first axis with the second axis.

In one embodiment, the first carousel and the second carousel can be configured to be driven in a stop-and-go mode for conveying the sample tube carriers between operating positions or stations assigned to the first carousel and/or the second carousel. The number of recesses and, hence, the angular displacement at each step can be configured to the number of operating positions required. For example, in one embodiment, each carousel can be driven to rotate by about 72°, i.e. 360°/5, in each step.

In order to ensure an error-free operation and/or to allow for immediate action in case of an error, in one embodiment, a control device comprising at least one contactless monitoring sensor such as, for example, at least one optical monitoring sensor, can be provided.

The sample handling device, in particular, can be suitable to use with carriers having a body with circular periphery allowing for a smooth guidance along the guide paths. In one embodiment, carriers having a body with a circular periphery and retaining several sample tubes can be provided. In some embodiments, the recesses of the first and the second carousel can be arranged for receiving a sample tube carrier retaining a single sample tube. Such carriers can be also referred to as pucks.

In order to link the device to other elements of a laboratory automation system, in one embodiment, at least one entry region for feeding sample tube carriers to the first carousel, and at least one exit region for taking over sample tube carriers from the second carousel can be provided. In one embodiment, two entry regions for feeding sample tube carriers to the first carousel and the second carousel, respectively, and at least two exit regions for taking over sample tube carriers from the first carousel and second carousel, respectively, can be provided.

In one embodiment, the sample handling device can be linked at the at least one entry region and/or at the at least one exit region to a sample distribution system comprising linear inlet conveyor devices such as, for example a belt conveyor device. Alternatively, to the belt conveyor devices, in one embodiment, screw conveyor devices can be provided for feeding the sample tube carries to the first carousel and/or for taking over sample tube carriers from the second carousel. A distance of the first carousel and the second carousel, in one embodiment, can be adapted to the distance between the linear inlet conveyor and the linear outlet conveyor defined by conveyor lines of an already established laboratory automation system.

In one embodiment, at least two linear inlet conveyor devices such as, for example, two belt conveyor devices, for feeding sample tube carriers to the first carousel and the second carousel, respectively, and at least two linear outlet conveyor devices such as, for example, two belt conveyor devices, for taking over sample tube carriers from the first carousel and second carousel, respectively, can be provided. In this case, the device can also be used to distribute sample tube carriers to alternative lines of a laboratory automation system.

In still another embodiment, the sample handling device can be arranged adjacent to a distribution system comprising a transport plane such as, for example, a magnetizable transport plane. A number of electro-magnetic actuators can be stationary arranged below the transport plane. The electro-magnetic actuators can be configured to move a sample tube carrier on top of the transport plane by applying a magnetic force to said sample tube carrier. Such a system is described for example in WO 2013/064665 A1 which is hereby incorporated by reference.

A laboratory automation system is also presented. The laboratory automation system can comprise a plurality of pre-analytical, analytical and/or post-analytical stations and a sample handling device as described above.

Figure 2:
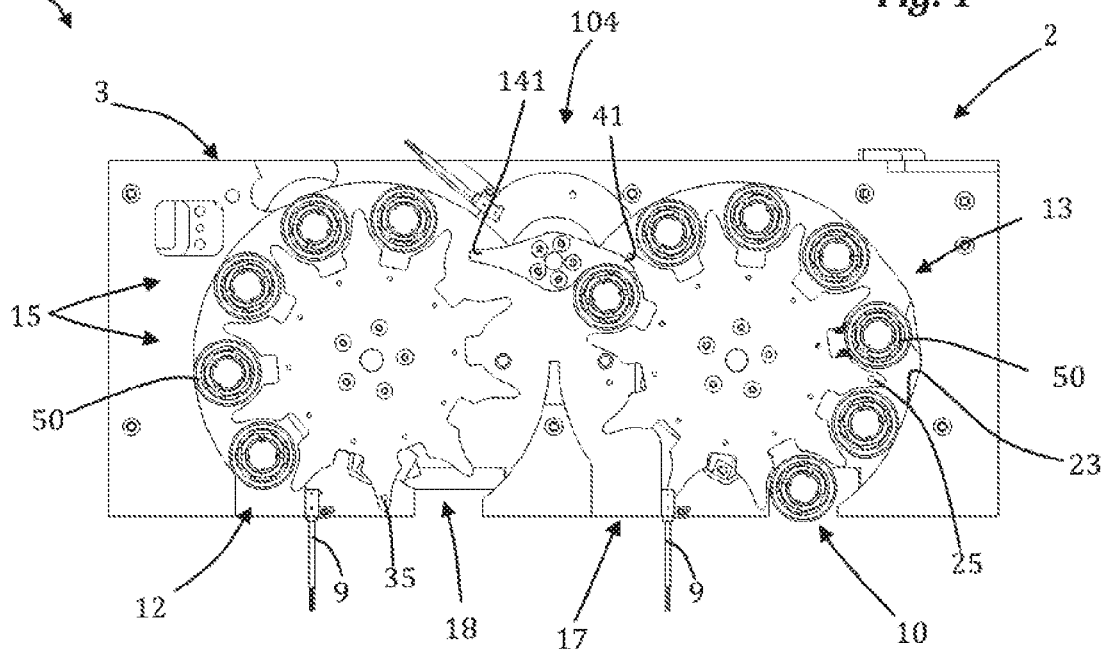
FIG. 2 illustrates a top view of the sample handling device of FIG. 1 in a second operation mode according to an embodiment of the present disclosure.

FIGS. 1 and 2 each show a top view of first embodiment of a sample handling device 1 comprising a first carousel 2 with a disc 21 supported rotatably about a first axis 20, a second carousel 3 with a disc 31 supported rotatably about a second axis 30 parallel to the first axis 20, and a transfer element in the form of a track switch 104 arranged between the first carousel 2 and the second carousel 3 for selectively transferring sample tube carriers 50, 52 from the first carousel 2 to the second carousel 3. The track switch 104 shown in FIGS. 1 and 2 comprises a first radially extending finger 41 and can be rotatable or swivelable out of rest position shown in FIG. 1 about a third axis 40 parallel to the first axis 20 for effecting a transfer of a sample tube carrier 50, 52 from the first carousel 2 to the second carousel 3. In the embodiment shown, the track switch 104 can further be provided with a second finger 42. The first finger 41 and the second finger 42 can be offset by about 180° about the third axis 40. The first finger 41 and the second finger 42 can be differ in shape.

The carousels 2, 3 and the track switch 104 can be arranged on a platform 7. A drive system (not shown) for driving the carousels 2, 3 and the track switch 104 can be arranged underneath the platform 7.

Each disc 21, 31 can have a plurality of recesses 22, 32, namely ten recesses 22, 32 in the embodiment shown, in which recesses 22, 32 can be distributed radially about a perimeter of the discs 21, 31. Each recess 22, 32 can be configured to receive a sample tube carrier 50, 52. Nine sample tube carriers 50, 52 are schematically shown in FIG. 1 received in each of the discs 21, 31. The discs 21, 31 of the carousels 2, 3 can be rotated for moving the sample tube carriers 50, 52. In order to retain the carriers 50, 52 in the recesses 22, 32, guide rails 23, 33 encircling at least part of the discs 21, 31 periphery can be provided. The carriers 50, 52 can be retained within a respective recess 22, 32 while being supported between contact surfaces 220, 320 of the recesses 22, 32 itself and the respective guide rail 23, 33. In the region of the track switch 104, the guide rails 23, 33 can each be provided with a clearance for forming a passage. The first carousel 2 and the second carousel 3 can be connected via the passage allowing the sample tube carriers 50, 52 to be transferred between the carousels 2, 3 via the passage. When the track switch 104 is arranged in the rest position shown in FIG. 1, the clearance in the guide rails 23, 33 is at least partly bridged by the second finger 42, which can be shaped to extend the guide rails 23, 33. Thereby, the passage can be closed or blocked.

Circles enclosing the rotated discs 21, 31 of the carousels 2, 3 and the rotating or swiveling track switch 104 can be referred to as envelope curves. The envelope curve 44 of the finger 41 of the track switch 104 is schematically shown as a dash-dot line in FIG. 1. As can be seen in FIG. 1, in the embodiment shown, a distance between the first axis 20 and the third axis 40 can be less than the sum of the radius of the envelope curve 44 of the finger 41 and the radius of the envelope curve of the first carousel 2. Likewise, as the carousels 2, 3 can be arranged in mirror symmetry and at least the discs of the carousels 2, 3 can be identical in construction, a distance between the second axis 30 and the third axis 40 can be less than the sum of the radius of the envelope curve 44 of the finger 41 and the radius of the envelope curve of the second carousel 3. In consequence, the fingers 41 of the track switch 104 upon rotation can overlap the discs 21, 31 of the carousels 2, 3 in a plane substantially perpendicular to the axes 20, 30, 40. However, in order to avoid a collision, the discs 21, 31 of the carousels 2, 3 can be offset in the direction of the axes 20, 30, 40 from the finger 41 of the track switch 104. In the embodiment shown, the finger 41 can be arranged in a plane above the discs 21, 31.

In the embodiment shown, both carousels 2, 3 can be rotated in a counter-clockwise direction as indicated by arrows in FIG. 1. When the tracks switch 104 is arranged in the rest position as shown in FIG. 1, the first carousels 2 can be separated from the second carousel 3. Sample tube carriers 50, 52 can be fed to the first carousel 2 at an entry region 10 and leave the first carousel 2 at an exit region 12. Likewise, sample tube carriers 50, 52 can be fed to the second carousel 3 at an entry region 17 and leave the second carousel 3 at an exit region 18. In the embodiment shown, four belt conveyors 19 are provided. In one embodiment, two belt conveyor devices 19 can be provided at the entry regions 10, 17 for feeding sample tube carriers 50, 52 to the first carousel 2 and the second carousel 3, respectively, and two belt conveyor devices 19 can be provided at the exit regions 12 and 18 for taking over sample tube carriers 50, 52 from the first carousel 2 and second carousel 3, respectively.

When the tracks switch 104 is arranged in the rest position as shown in FIG. 1, the two carousels 2, 3 can be operated to a large degree independently. At several operating positions 13, 15 provided at the periphery of the first carousel 2 and the second carousel 3, stations (not shown) for processing the samples for example pipetting stations or diluting stations and/or stations for inserting sample tubes into the sample tube carrier 50, 52 and/or removing sample tube from the sample tube carriers 50, 52 can be provided. When rotating the carousels 2, 3, sample tube carriers 50, 52 can be moved between the operating positions. In some embodiments, the carousels 2, 3 can be operated in a stop-and-go mode for moving a sample tube carrier 50, 52 to one operating position 13, 15, stopping the movement and carrying out the processing at the operating position while holding the carrier 50, 52 in the operating position and, thereafter moving the carrier 50, 52 to the next operating position and/or transferring the carrier to the subsequent carousel 3. Due to the dimensioning and the number of recesses 22, 32, in the embodiment shown, each disc 21, 31 can be moved by 360°/10=36° in each step.

In the embodiment shown, sample tube carriers 50 retaining test tubes can be fed to the first carousel 2 at the entry region 10, test tubes can be removed from the carriers 50 at one of the operating positions 13 and empty sample tube carriers 52 can be transferred to the belt conveyor 19 provided at the exit region 12 of the first carousel 2. On the other hand, empty sample tube carriers 52 not retaining test tubes can be fed to the second carousel 3 at the entry region 17, test tubes can be inserted into the empty sample tube carriers 52 at one of the operating positions 15 and sample tube carriers 50 retaining sample tubes can be transferred to the belt conveyor 19 provided at the exit region 18 of the second carousel 3.

The track switch 104 can be configured to rotate to selectively transfer a sample tube carrier 50, 52 from the first carousel 2 and, hence, a first line, to the second carousel 3, and, hence, a second line. For example, in case of a malfunction of the station 13 removing test tubes from the sample tube carriers 50, a transport of sample tube carriers 50 still retaining test tube to the exit region of the first carousel 2 can be avoided and the sample tube carriers 50 can be transferred to the second carousel 3.

The first finger 41 can serve to move a carrier 50 along a curved such as, for example, circular-arc path from the first carousel 2 to the second carousel 3. For this purpose, the first finger 41 in the embodiment shown can be hook-shaped allowing to at least partly grip the sample tube carrier 50 for a transfer to the second carousel 3.

As mentioned above, the second finger 42 can differ in shape. In the rest position shown in FIG. 1, the second finger 42 can be configured in order to extend the guide rails 23, 33 of the first carousel 2 and the second carousel 3, such that in the rest position shown in FIG. 1, sample tube carriers 52 transported in the first carousel 2 can be guided along the second finger 42 and conveyed towards the belt conveyor device 19 arranged at the exit region 12 of the first carousel 2. When rotating the track switch 104 in a clock-wise direction over at least about 45°, in the embodiment shown over about 90°, the second finger 42 can be moved out of the region extending the guide rail 23. The first finger 41 can engage with the sample tube carrier 50 as shown in FIG. 2 and can effect a transfer of the sample tube carrier 50 towards the second carousel 3.

In some embodiments, the track switch 104 can be driven to perform one full revolution in order to transfer one carrier 50 from the first carousel 2 to the second carousel 3. For this purpose, the first carousel 2 can be stopped to avoid any collision with sample tube carriers 50 in the first carousel 2 and the track switch 104 upon rotation of the track switch. The second carousel 3 can be advanced without empty sample tube carriers 52 being fed to the second carousel 3, until at least two consecutive empty recesses 32 are arranged in the region of the track switch 104. Next, the track switch 104 can be operated for effecting the transfer. After the transfer is completed and the track switch 104 is moved back to the rest position, the first carousel 2 can be restarted. In one embodiment, the track switch 104 can be driven with varying speed, in order to move the first finger 41 at the transfer regions with the same circumferential speed as the discs 21, 31 of the carousels 2, 3, but to move the track switch 104 at a higher speed before engaging with the carrier 50 and after releasing the carrier 50.

In the embodiment shown, a contactless sensor 9 can be provided, which can be configured to detect, for example, a marker provided on the first finger 41 for detecting a movement of the track switch 104 back into the rest position. In addition, in the periphery of the carousels 2, 3 two further contactless sensors 9 can be provided for detecting markers 25, 35 provided on the discs 21, 31, respectively.

Figure 3:
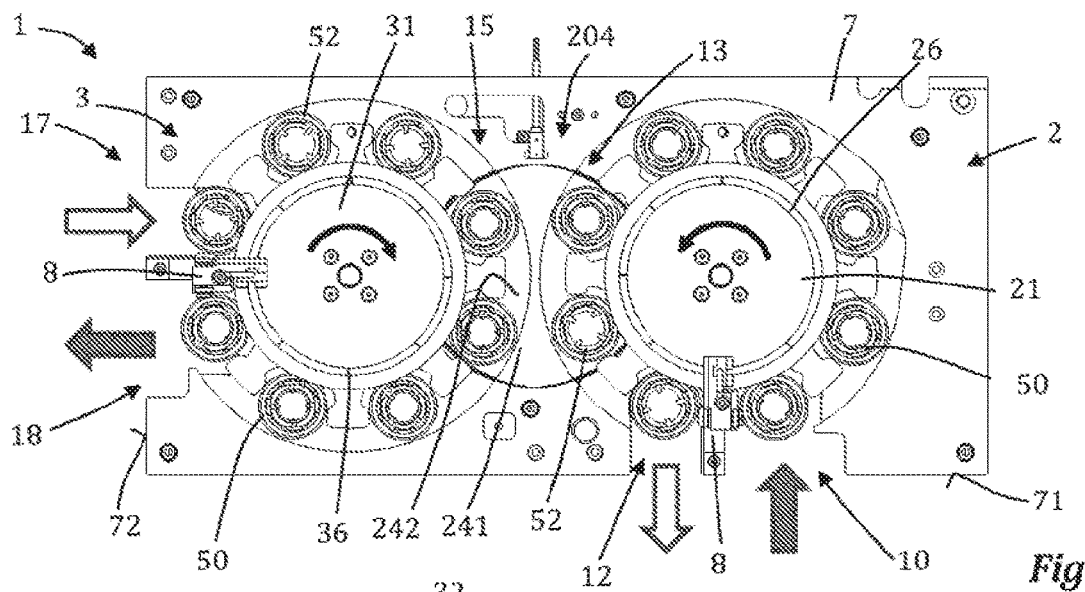
FIG. 3 illustrates a top view of a sample handling device in a first operation mode according to a second embodiment of the present disclosure.
Figure 4:
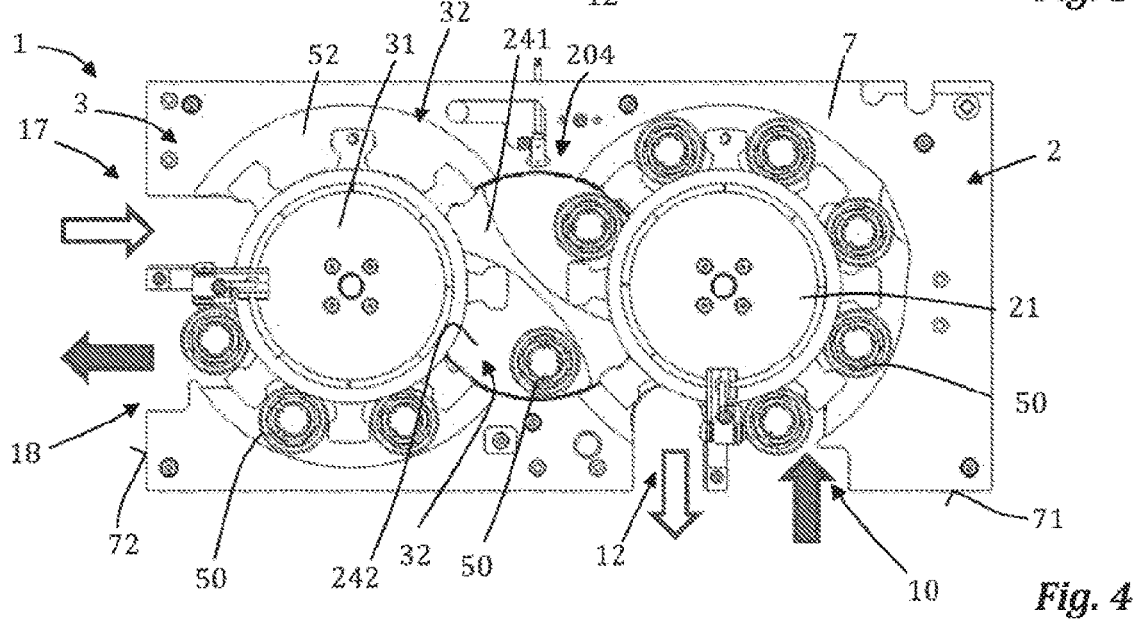
FIG. 4 illustrates a top view of the sample handling device of FIG. 3 in a second operation mode according to an embodiment of the present disclosure.

FIGS. 3 and 4 show a top view of second embodiment of a sample handling device 1 similar to the device shown in FIGS. 1 and 2 comprising a first carousel 2 with a disc 21 and a second carousel 3 with a disc 31. Each carousel 2, 3 can have an entry region 10 and 17 for feeding sample tube carriers 50, 52 to the carousels 2, 3 and exit regions 12 and 17 for taking over sample tube carriers 50, 52 from the carousels 2, 3.

In the embodiment shown in FIGS. 3 and 4, the entry region 10 and the exit region 12 of the first carousel 2 can be arranged at a first side face 71 of the platform 7 and the entry region 17 and the exit region 18 of the second carousel 3 can be arranged at a second side face 72. The second side face 72 can be adjacent to the first side face 71. The platform can have a substantially rectangular surface area and the first and the second side faces 71, 72 enclose an angle of about 90°.

In the operation mode shown in FIG. 3, sample tube carriers 50 retaining test tubes can be fed to the first carousel 2, test tubes can be removed from the carriers 50 at one of the operating positions 13 and empty sample tube carriers 52 can be transferred to a belt conveyor or any other distribution system provided at the exit region 12 of the first carousel 2. Likewise, empty sample tube carriers 52 not retaining test tubes can be fed to the second carousel 3 at the entry region 17, test tubes can be inserted into the empty sample tube carriers 52 at one of the operating positions 15, and sample tube carriers 50 retaining sample tubes can be transferred to a distribution system provided at the exit region 18 of the second carousel 3. In contrast to the previous embodiments, both carousels 2, 3 can be driven to rotate in the opposite directions of rotation as indicated by arrows.

A track switch 204 comprising a disc 242 and a separation wall 241 can be provided between the two carousels 2, 3. The track switch 204 can be configured to rotate about a rotation about a third axis 40 parallel to the first axis 20 of the first disc 21 and the second axis 30 of the second disc 31. In the embodiment shown in FIGS. 3 and 4, all three axes 20, 30, 40 can be arranged in a straight line.

In the region of the track switch 204, the guide rails 23, 33 can each be provided with a clearance for forming a passage, via which passage the sample tube carriers 50, 52 can be transferred between the carousels 2, 3. When the track switch 204 is arranged in the rest position shown in FIG. 3, the clearance in the guide rails 23, 33 can be fully bridged by the separation wall 241, which can be shaped to extend the guide rails 23, 33. In the embodiment shown, the separation wall 241 can be arranged on the disc 242 to rotate together with the disc 242 about the third axis.

If required, the track switch 204 can be driven to transfer sample tube carriers 50, 52 from the first carousel 2 to the second carousel 3 or vice versa.

FIG. 4 shows an operation, wherein sample tube carriers 50 can be transferred from the first carousel 2 to the second carousel 3. For this purpose, the first carousel 2 can be stopped and second carousel 3 can be completely unloaded or at least unloaded to have to a series of consecutive empty recesses 32 arranged at a transfer area.

Next, the second carousel 3 can be stopped and the track switch 204 can be driven to rotate at least by about 180°. At first the track switch 204 is driven to rotate together with the first carousel 2 and after forwarding the first carousel 2 one step ahead, the track switch 204 can be driven to rotate about its axis of rotation to move a sample tube carrier 50 from the first carousel 2 to the second carousel 3. The speed of the track switch 204 can be configured to that of the first disc 21 such that the track switch 204 can be rotated about 90° to about 180° while the first disc 21 rotates about 36°. Next, the two carousels 2, 3 may resume the independent operation, or, if required, the second carousel 3 can be driven to move one step of about 36° ahead and the process of transferring one sample tube carrier 50 from the first carousel 2 to the second carousel 3 can be repeated.

For an automated operation, a control device comprising a contactless monitoring sensor such as, for example, an optical sensor can be provided. In the embodiment shown, at each carousel 2, 3, an optical sensor 8 can be configured to detect grooves 26, 36 provided at the disc 21, 31 of the first carousel 2 and second carousel 3 for an identification of a position of the discs 21, 31.

Figure 5:
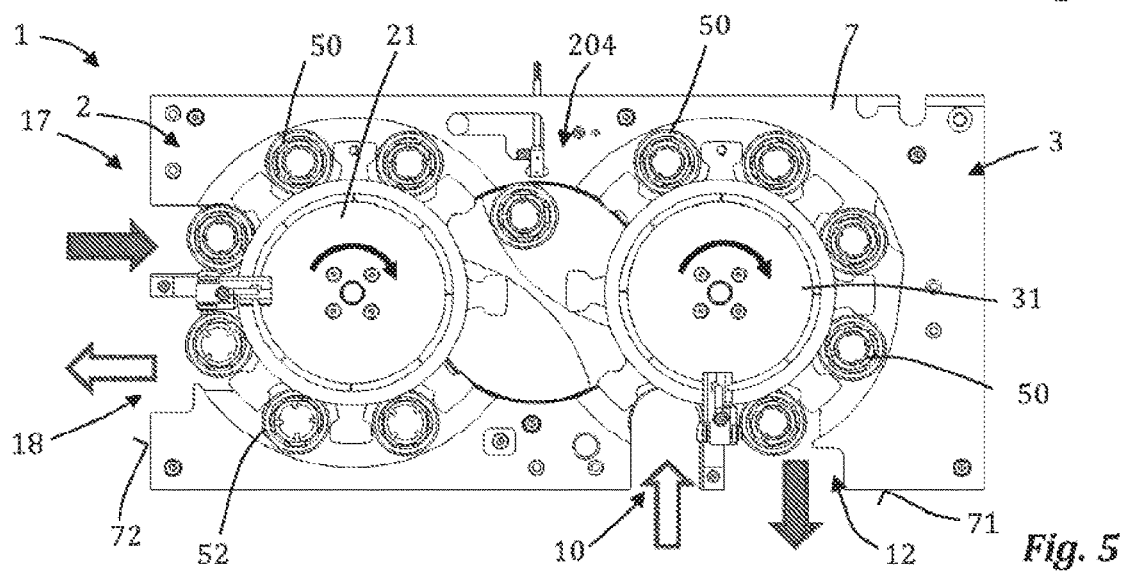
FIG. 5 illustrates a top view of a sample handling device similar to FIGS. 3 and 4 in a second operation mode according to a third embodiment of the present disclosure.

FIG. 5 shows a top view of third embodiment of a sample handling device 1 similar to the device shown in FIGS. 3 and 4 comprising a first carousel 2 with a disc 21 and a second carousel 3 with a disc 31. Each carousel 2, 3 can have an entry region 10 and 17 for feeding sample tube carriers 50, 52 to the carousels 2, 3 and exit regions 12 and 18 for taking over sample tube carriers 50, 52 from the carousels 2, 3. In contrast to the embodiment shown in FIGS. 3 and 4, the first carousel 2 can be arranged to have the entry region 10 and the exit region 12 at the second side face 72 and both discs 21, 31 can be driven to rotate in the same direction as indicated by arrows.

The features of the embodiments shown, can be combined in order to obtain further embodiments. For example, in one alternative embodiment, a track switch comprising a disc and a separation wall can be provided instead of the track switch having two radially extending fingers offset about 180° in the embodiment shown in FIGS. 1 and 2. Similar, in a further embodiment, a track switch comprising two radially extending fingers offset about 180° can be provided instead of the track switch comprising a disc with a separation wall in the embodiment of FIGS. 3 to 5, wherein upon the transfer between the carousels, the sample tube carriers 50, 52 can be slidingly moved across the surface of the platform 7.

The sample handling device 1 can be used in various different laboratory automation systems. Depending on the requirements of the system, different stations can be provided at the operating positions 13, 15 at the periphery of the carousels 2, 3. Conceivable stations include, but are not limited to pipetting stations, diluting stations, hand-over stations for loading or unloading the sample tube carriers, bar code reading stations, capping or de-capping stations.

In all embodiments shown, the carriers 50, 52 can be arranged to retain one single sample tube allowing for an individual distribution of the sample tubes to designated stations or modules of a laboratory automation system.

In the embodiments shown, rails or belt conveyors 19 can be provided for feeding the sample tube carriers 50 at the entry region 10, 17 to the first carousel 2 or the second carousel 3 and for receiving sample tube carriers 50, 52 at the exit region 12, 18 from the second carousel 3. In another embodiment, the device 1 can be arranged adjacent to a distribution system comprising a transport plane. A plurality of electro-magnetic actuators can be stationary arranged below the transport plane. The electro-magnetic actuators can be configured to move a sample tube carrier on top of the transport plane by applying a magnetic force to the sample tube carrier.

It is noted that terms like "preferably," "commonly," and "typically" are not utilized herein to limit the scope of the claimed embodiments or to imply that certain features are critical, essential, or even important to the structure or function of the claimed embodiments. Rather, these terms are merely intended to highlight alternative or additional features that may or may not be utilized in a particular embodiment of the present disclosure.

For the purposes of describing and defining the present disclosure, it is noted that the term "substantially" is utilized herein to represent the inherent degree of uncertainty that may be attributed to any quantitative comparison, value, measurement, or other representation. The term "substantially" is also utilized herein to represent the degree by which a quantitative representation may vary from a stated reference without resulting in a change in the basic function of the subject matter at issue.

Having described the present disclosure in detail and by reference to specific embodiments thereof, it will be apparent that modifications and variations are possible without departing from the scope of the disclosure defined in the appended claims. More specifically, although some aspects of the present disclosure are identified herein as preferred or particularly advantageous, it is contemplated that the present disclosure is not necessarily limited to these preferred aspects of the disclosure.

We claim:

1. A sample handling device for handling sample tube carriers, the sample handling device comprising:
   a first carousel with a disc supported rotatably about a first axis;
   a second carousel with a disc supported rotatably about a second axis parallel to the first axis;
   wherein each disc has a plurality of recesses distributed radially about a perimeter of the disc and each recess is configured to receive one sample tube carrier; and
   at least one track switch arranged between the first carousel and the second carousel,
   wherein the at least one track switch which is movable into and out of a rest position by swiveling and/or rotating about a third axis parallel to the first axis for selectively transferring a selected sample tube carrier from the first carousel to the second carousel via a passage; and
   guide rails encircling at least part of the periphery of the first and second carousels,
   wherein the guide rails are each provided with a clearance for forming the passage between the first carousel and the second carousel,
   wherein the first carousel and the second carousel are configured to connect via the passage allowing for the selective transfer of the selected sample tube carrier between the first carousel and the second carousel,
   wherein the at least one track switch, in the rest position, at least partly bridges the clearance in the guide rails for at least partly closing the passage between the first carousel and the second carousel to separate the first carousel from the second carousel, such that the transfer of sample tube carriers between the first carousel and second carousel is blocked.

2. The sample handling device according to claim 1, wherein the track switch comprises at least one radially extending finger, wherein the at least one finger is configured to push the selected sample tube carrier from the first carousel to the second carousel when rotating the track switch about the third axis out of the rest position and in the rest position of the track switch at least partly closes the passage between the first carousel and the second carousel.

3. The sample handling device according to claim 1, wherein the track switch comprises at least a first finger and a second finger offset to the first finger by about 1800, wherein the first finger is configured to push the selected sample tube carrier from the first carousel to the second carousel when rotating the track switch about the third axis out of the rest position and the second finger in the rest position of the track switch at least partly closes the passage between the first carousel and the second carousel.

4. The sample handling device according to claim 3, wherein the first finger is hook-shaped.

5. The sample handling device according to claim 1, wherein the track switch comprises a disc with a separation wall, wherein in the rest position of the track switch, the separation wall at least partly closes the passage between the first carousel and the second carousel, and wherein the disc together with the separation wall is configured to be swiveled and/or rotated out of the rest position to selectively transfer the selected sample tube carrier from the first carousel to the second carousel.

6. The sample handling device according to claim 2, wherein a distance between the first axis and the third axis is less than the sum of the radius of an envelope curve of the at least one track switch and the radius of an envelope curve of the first carousel and/or a distance between the second axis and the third axis is less than the sum of the radius of the envelope curve of the at least one track switch and the radius of an envelope curve of the second carousel, and wherein the at least one finger is offset in the direction of the third axis from the disc of the first carousel and the disc of the second carousel, respectively.

7. The sample handling device according to claim 1, wherein the first carousel and the second carousel are configured to be driven in a stop-and-go mode for conveying the sample tube carriers between stations assigned to the first carousel and/or the second carousel.

8. The sample handling device according to claim 1, further comprises a control device comprising at least one contactless monitoring sensor.

9. The sample handling device according to claim 8, wherein the at least one contactless monitoring sensor is an optical sensor.

10. The sample handling device according to claim 1, wherein the recesses of the first and the second carousel are configured to receive one sample tube carrier, in which the sample tube carrier is designed to retain one single sample tube.

11. The sample handling device according to claim 1, further comprises, at least one entry region for feeding sample tube carriers to the first carousel, and at least one exit region for taking over sample tube carriers from the second carousel.

12. The sample handling device according to claim 11, further comprises, two entry regions for feeding sample tube carriers to the first carousel and the second carousel respectively, and at least two exit regions for taking over sample tube carriers from the first carousel and second carousel respectively.

13. The sample handling device according to claim 11, wherein the sample handling device is linked at the at least one entry region and/or at the at least one exit region to a sample distribution system comprising linear inlet conveyor devices and/or a transport plane.

14. The sample handling device according to claim 13, wherein the linear inlet conveyor devices are belt conveyor devices.

15. The sample handling device according to claim 13, wherein the transport plane is a magnetizable transport plane.

16. A laboratory automation system, the laboratory automation system comprising: a plurality of pre-analytical, analytical and/or post-analytical stations; and a sample handling device according to claim 1.

17. The sample handling device according to claim 5, wherein a distance between the first axis and the third axis is less than the sum of the radius of an envelope curve of the at least one track switch and the radius of the envelope curve of the first carousel and/or a distance between the second axis and the third axis is less than the sum of the radius of the envelope curve of the at least one track switch and the radius of an envelope curve of the second carousel and wherein the separation wall of the at least one track switch is offset in the direction of the third axis from the disc of the first carrousel and the disc of the second carousel respectively.

* * * * *